United States Patent [19]

Schneider et al.

[11] Patent Number: 5,029,091
[45] Date of Patent: Jul. 2, 1991

[54] GROUND MODE CONTROL OF AIRCRAFT PROPELLER SPEED AND PITCH

[75] Inventors: Roy W. Schneider, Ellington; Eugenio DiValentin, Enfield, both of Conn.

[73] Assignee: United Technologies Corporation, Hartford, Conn.

[21] Appl. No.: 336,269

[22] Filed: Apr. 11, 1989

[51] Int. Cl.$^5$ .................. G06F 15/48; B63H 3/10; B64C 11/34; F01D 7/00
[52] U.S. Cl. .................. 364/431.01; 364/431.07; 416/25; 416/35; 416/44
[58] Field of Search .............. 364/433, 431.01, 431.04, 364/431.07; 416/25, 27, 30, 46, 153, 154, 31, 35, 43, 44

[56] References Cited

U.S. PATENT DOCUMENTS

| | | | |
|---|---|---|---|
| 2,664,166 | 12/1953 | Swaab | 416/25 |
| 2,855,054 | 10/1958 | Morgan et al. | 416/25 |
| 2,913,056 | 11/1959 | Farkas | 416/30 |
| 2,980,188 | 4/1961 | Allen, Jr. et al. | 416/153 |
| 4,711,615 | 12/1987 | Rusu | 416/46 |
| 4,772,180 | 9/1988 | Walker et al. | 416/25 X |
| 4,904,157 | 2/1990 | Pace et al. | 416/46 |
| 4,958,289 | 9/1990 | Sum et al. | 364/431.01 |

Primary Examiner—Thomas G. Black
Assistant Examiner—Edward J. Pipala
Attorney, Agent, or Firm—Ronald R. Snider

[57] ABSTRACT

A ground mode pitch position logic and control is shown and described in this invention. A method for scheduling and limiting the pitch actuator reference signal in accordance with the actuator commanded schedule, propeller overspeed and propeller underspeed.

10 Claims, 4 Drawing Sheets

GROUND MODE PITCH POSITION SCHEDULE LOGIC

GROUND MODE CONTROL OF AIRCRAFT PROPELLER SPEED AND PITCH

TECHNICAL FIELD

This invention relates to control of propeller pitch and speed governing during transients while the aircraft is in the ground mode.

Aircraft propulsion systems utilizing propellers must simultaneously control engine power and propeller speed. The control variables used to accomplish this task are primarily engine fuel and propeller pitch angle. During most ground operations, engine fuel governs propeller speed while propeller pitch is used to schedule power. During flight operation, engine fuel is generally used to control engine power while propeller pitch governs propeller speed.

BACKGROUND ART

Mismatches between engine delivered power and propeller absorbed power will cause unacceptable variations in propeller speed. Mismatches generally occur when the propeller governor is unable to change the speed governing control fast enough to follow changes in scheduled power. For example, ground mode operation schedules propeller pitch to achieve a scheduled power. These changes in propeller pitch can change propeller absorbed power faster than the engine can change delivered power, causing a power mismatch which will yield unacceptable variations in propeller speed.

It is important to keep the speed of the propeller nearly constant during ground operations. This is necessary because of the use of auxiliary equipment, such as alternators, being driven from the propeller gear box. Auxiliary equipment requires that the change in propeller speed not be great. It is also known in the art that when propeller power is lowered, the propeller absorbs less power quicker than the engine can decrease power, and therefore propeller overspeed conditions result. Stated another way, if a decrease in blade angle is commanded, the propeller will accelerate and propeller overspeed may result because of the lag in the engine. Ideally, the goal during ground operations is a constant propeller speed.

The present practice is to partially address the problem of control of propeller speed by including a propeller pitch rate limit to limit the rate of change of propeller absorbed power. This is just a fixed rate limit on propeller angle rate of change.

In Ground Mode operation where engine fuel is used to govern propeller speed, and propeller pitch is scheduled as a function of commanded power (PLA), a rapid change in commanded PLA will cause a rapid change in propeller pitch with a corresponding rapid change in propeller absorbed power. The present art partially addresses this problem by including a propeller pitch rate limit to limit the rate of change of propeller absorbed power. However, there still are situations when engine constraints prevent changes in engine delivered power fast enough to match the scheduled changes in propeller absorbed power. The result of this power mismatch is an undesirable excessive change in propeller speed.

DISCLOSURE OF THE INVENTION

According to this invention, propeller speed error can be used to modify the propeller pitch schedule during transient conditions so that the rate of change of propeller absorbed power does not exceed the capability of the engine rate of change of delivered power. In effect, the propeller pitch provides propeller speed governing during transient conditions when the rate of change of engine delivered power is at or near its rate limit. Three transient conditions benefit from this invention, which are:

1) Commanding a decrease in PLA while in the Ground Mode and forward thrust regime.

2) Commanding an increase in PLA while in the Ground Mode and forward thrust regime (increase in engine delivered power).

3) Commanding an increase in reverse thrust while in the Ground Mode and reverse thrust regime (which also requires an increase in engine delivered power).

These three transient conditions are set forth herein below.

Commanding a Decrease in PLA while in the Ground Mode and Forward Thrust Regime The concept presented in this disclosure is that the pitch rate limit for decreasing pitch is modified to be a scheduled function of propeller overspeed error. The propeller pitch rate limit becomes smaller when propeller overspeed becomes larger. In effect, the decreasing propeller pitch moves slower to match the propeller absorbed power to the existing rate of decrease in engine delivered power. This pitch rate limit is deleted when the pitch is decreased to near or below flat pitch.

Commanding an Increase in PLA While in the Ground Mode Forward Thrust Regime This concept is similar to the concept for the decrease in PLA. The increasing pitch rate limit is a scheduled function of propeller underspeed error. The propeller pitch rate limit becomes smaller when propeller underspeed becomes larger. In effect, the increasing propeller pitch moves slower to match the propeller absorbed power to the existing rate of increase in engine delivered power. This pitch rate limit is deleted when pitch is near flat pitch or below flat pitch.

Commanding an Increase in Reverse Thrust While in the Ground Mode and Reverse Thrust Regime (an increase in engine delivered power)

The reverse pitch limit is a scheduled function of propeller underspeed. The pitch is limited to less reverse pitch as propeller underspeed becomes larger. In effect, propeller pitch will go toward the scheduled reverse pitch to yield a propeller absorbed power that will not exceed the capability of the engine to increase delivered power.

This invention utilizes the engine full authority digital electronic control (FADEC) logic to address the problem noted above. Control logic to implement the new concepts of this invention can be done in a number of ways. One method of implementing control logic is described herein, and is the method which has been used with the FADEC logic. However, it is to be understood that this invention may be implemented on other digital engine controls such as the Electronic Engine Control (EEC).

In the prior art, propeller pitch control for ground mode operation schedules the pitch actuator position reference signal (XSREFS) as a function of PLA as shown in FIG. 1. In FIG. 1, the univariate function is a map table look-up, B-¾ REF is the commanded blade angle at the ¾ radius. The implementation of the univariate function 1 and the equation 2 may be within the FADEC logic. The output to the blade position servo XSREFS is also shown in FIG. 3. The term XS generally refers to the servo position of the pitch actuator. The pitch actuator for a typical pitch control is on the propeller center-line and the actuator piston is linked to the individual blades of the propeller. The linear position of the actuator piston (XS) is therefore directly translatable into propeller pitch angle.

The foregoing and other objects, features and advantages of the present invention will become more apparent in the light of the foregoing detailed description of the preferred embodiments thereof as illustrated in the accompanying drawing(s).

DETAILED DESCRIPTION OF THE PREFERRED EMBODIMENT

Figure 2:
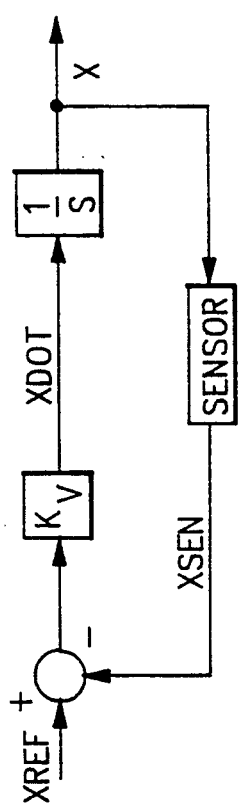
FIG. 2 is a simplified example of a servo mechanism used to derive equations for the method of rate limiting used in FIGS. 3 and 4.
Figure 3:
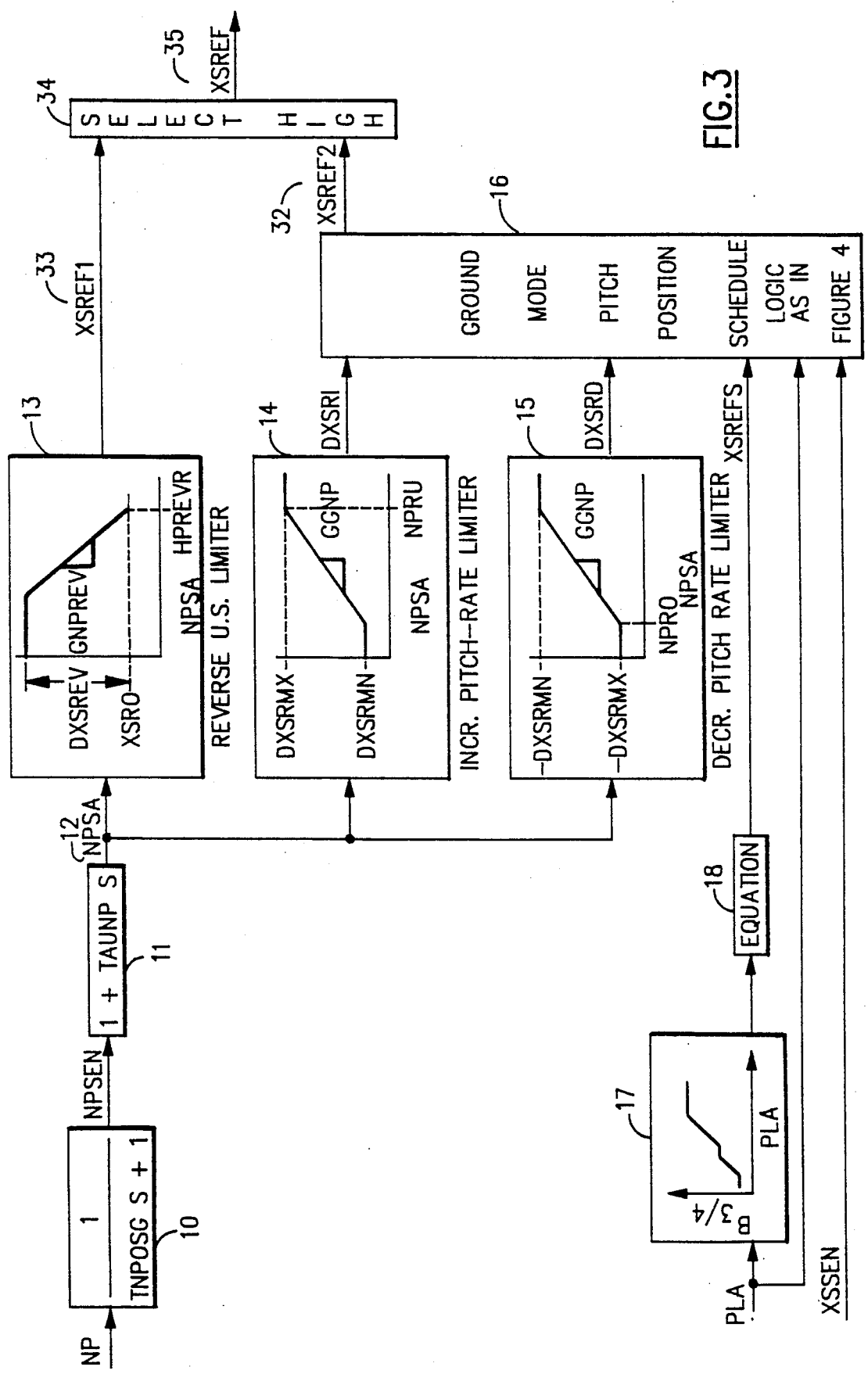
FIG. 3 shows an overall representation of the pitch actuator reference signal, which includes overspeed and underspeed limiting in accordance with this invention.
Figure 4:
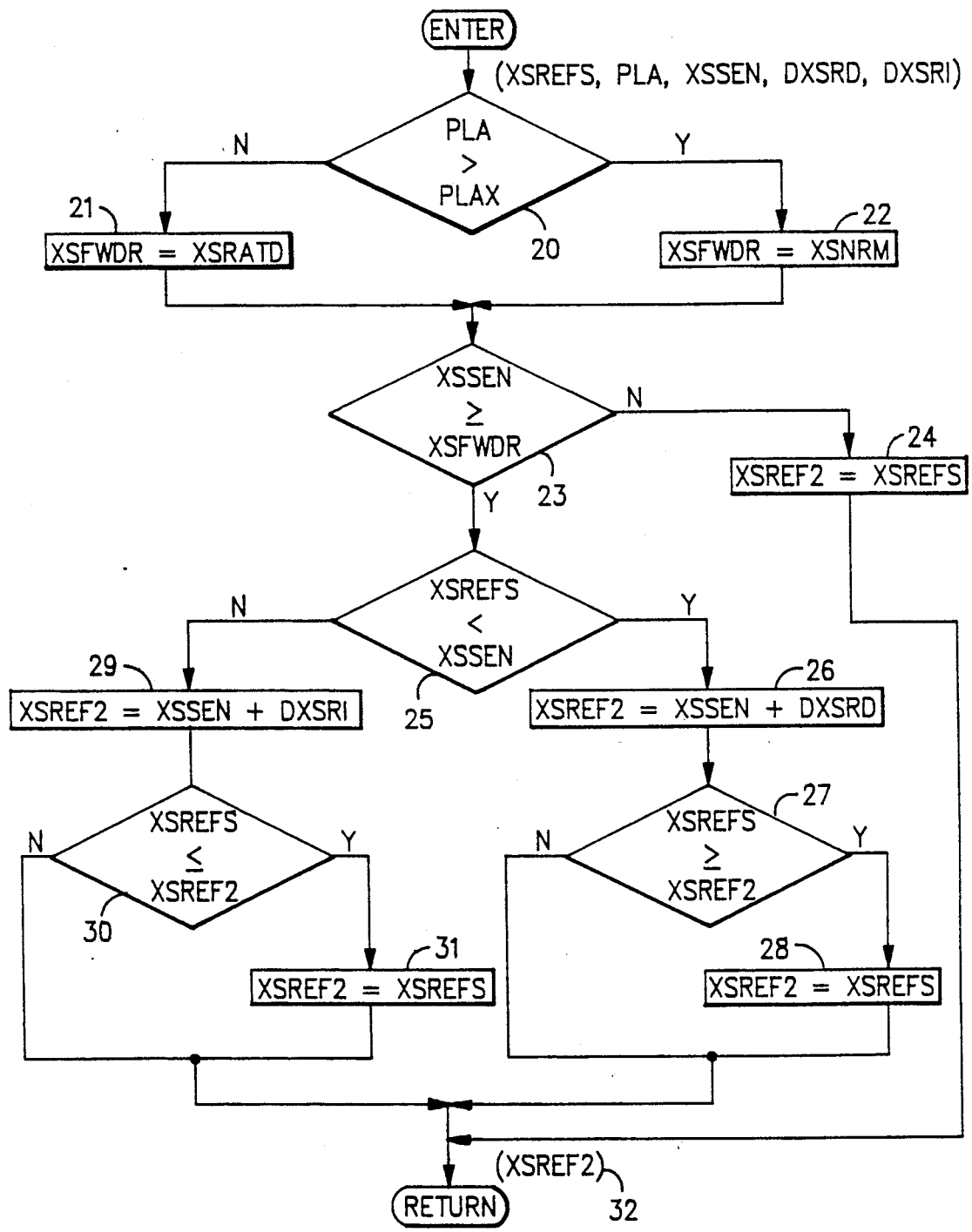
FIG. 4 shows a flowchart of the ground mode pitch position schedule logic.

Control logic for implementation of this invention is shown in FIGS. 3 and 4. A block in FIG. 3 identified as Ground Mode Pitch Position Schedule Logic 16 is presented in detail in FIG. 4. A method for pitch actuator rate limiting used in the logic in FIG. 4 is explained with FIG. 2 and equations 1 through 5. Table 1 and Table 2 provide a listing of the terms in FIGS. 2, 3 and 4 and their definitions which will be readily understood by those skilled in the art.

FIG. 2 is a simplified linearized block diagram of a typical servo, and will be used to explain the rate limiting method used in FIGS. 3 and 4. FIG. 2 shows the servo output position, X. The velocity of the servo output is XDOT and can be computed as follows:

$$XDOT = (XREF - XSEN) \times Kv \quad (1)$$

Rearranging equation 1 to solve for XREF yields $$XREF = XSEN + XDOT/Kv \quad (2)$$

The servo velocity XDOT can be made equal to a rate limit XDLIM by substituting XDLIM for XDOT to yield $$XREF = XSEN + XDLIM/Kv \quad (3)$$

TABLE 1

DESCRIPTION OF VARIABLES IN FIGS. 2, 3 AND 4

| | |
|---|---|
| B ¾ REF | Commanded propeller pitch angle at ¾ of propeller blade radius |
| DXSRD | Computed decrease-pitch rate limit parameter |
| DXPSRI | Computed increase-pitch rate limit parameter |
| NP | Propeller rotational speed |

TABLE 1-continued

DESCRIPTION OF VARIABLES IN FIGS. 2, 3 AND 4

| | |
|---|---|
| NPSA | Sensed propeller speed with dynamic compensation |
| NPSEN | Sensed propeller speed |
| PLA | Commanded power lever angle |
| X | Position output of a typical servo |
| XDOT | Velocity (or rate) output of a typical servo |
| XREF | Reference position of a typical servo |
| XSFWDR | Pitch actuator position at which the pitch actuator rate limits are deleted/invoked |
| XSREF | Pitch actuator position reference signal, which includes any applicable modification for underspeed and overspeed limiting |
| XSREF1 | Pitch actuator position references signal defining the maximum allowable reverse pitch |
| XSREF2 | Pitch actuator position reference signal consisting of XSREFS as modified by increase-pitch and decrease-pitch rate limits |
| XSREFS | Pitch actuator position reference signal, which is a scheduled function of PLA |
| XSSEN | Pitch actuator sensed position |

TABLE 2

DESCRIPTION OF CONSTANTS IN FIGS. 2, 3 AND 4

| | |
|---|---|
| DXSREV | Maximum permissible reset in XSREF1 from the full reverse position |
| DXSRMN | Minimum permissible increase-pitch rate limit for the pitch actuator |
| −DXSRMN | Minimum permissible decrease-pitch rate limit for the pitch actuator |
| DXSRMX | Maximum permissible increase-pitch rate limit for the pitch actuator |
| −DXSRMX | Maximum permissible decrease-pitch rate limit for the pitch actuator |
| GGNP | Control gain of the forward-thrust overspeed and underspeed limiters. The gain is units of DXSRI (or DXSRD) per revolution-per-minute (RPM) of NPSA. |
| GNPREV | Control gain of the reverse thrust underspeed limits. The gain is inches of XSREF1 per revolution-per-minute (RPM) of NPSA. |
| Kv | Velocity constant of a typical servo |
| NPREVR | Propeller underspeed at which the reverse underspeed limits start to reset XSREF1 |
| NPRO | Propeller overspeed at which the decrease-pitch limits start to reduce the maximum rate limit |
| NPRU | Propeller underspeed at which the increase-pitch limits stand to reduce the maximum rate limit. |
| PLAX | PLA position defining if reverse thrust has been requested |
| TAUNP | Time constant of propeller sensed speed lead compensation. |
| TNPOSG | Time constant of propeller speed sensor |
| XDLIM | Rate limit of a typical servo |
| XSNRM | Pitch actuator position at which rate limits are deleted when forward thrust is requested |
| XSRATO | Pitch actuator position at which rate limits are deleted when reverse thrust is requested. |

FIG. 2 and equations (1), (2) and (3) show that a servo rate limit is obtained by defining the servo reference XREF to be the sum of the present value of sensed servo output XSEN plus an increment XDLIM/Kv. The servo rate limit is embedded in the increment XDLIM/Kv. In FIG. 4 the increase-pitch rate limit is computed as $$XSREF2 = XSSEN + DXSRI \quad (4)$$

where DXSRI is equivalent to XDLIM/Kv in equation 3. Similarly, FIG. 4 computes the decrease-pitch rate limit as

XSREF2=XSSEN+DXSRD     (5)

where DXSRD is equivalent to XDLIM/Kv in equation 3.

It should be understood that other means exist for implementing rate limits in the control logic.

The computation of the rate limits DXSRD, DXSRI and XSREFI from propeller speed NP is shown in FIG. 3. Block 10 represents the dynamic response of a propeller speed sensor. This speed sensor dynamic response is approximated by a first order lag with a time constant TNPOSG to yield a sensed propeller speed NPSEN. Block 11 provides dynamic compensation of sensed propeller speed. The dynamic compensation shown in block 11 is a lead with lead time constant TAUNP. The output of block 11 is compensated sensed propeller speed NPSA (12). The term S in both block 10 and block 11 is the Laplace Transform operator.

Increasing servo position XS corresponds to increasing pitch B. Therefore, whenever an increase in XS is indicated, an associated increase in propeller pitch is implied. Referring now to FIG. 3 block 13 a method for computing a pitch actuator position reference signal XSREF1 is shown which provides underspeed limiting in the reverse thrust regime. XSREF1 is scheduled as a function of sensed pitch actuator position. Maximum reverse thrust occurs at an actuator position equal to XSRO. Whenever NPSA is greater than NPREVR, the propeller is not underspeeding. When NPSA is less than NPREVR, XSREF1 is scheduled to less than the maximum reverse thrust pitch actuator position XSRO. The control gain is GNPREV inches of XSREF1 per RPM of NPSA underspeed. The maximum amount of reset in XSREF1 from the full reverse thrust position is DXSREV inches of pitch actuator position. In this manner the amount of servo position movement (i.e. rate) is limited as a function of propeller underspeed.

Referring now to block 14, there is shown a method for computing an increasing-pitch rate limit parameter DXSRI. Block 14 shows that DXSRI is at maximum increase-pitch rate limit DXSRMX whenever NPSA is more than NPRU (i.e. propeller not underspeeding). When NPSA is less than NPRU, DXSRI is scheduled to less than the maximum increase-pitch rate limit. The control gain is GGNP units of DXSRI per RPM of NPSA. The minimum value of increase-pitch rate limit parameter DXSRI is DCSRMN.

Referring now to block 15, there is shown a method for computing a decrease-pitch rate limit parameter, DXSRD. Block 15 shows that DXSRD is at maximum decrease-pitch rate limit (−DXSRMX) when NPSA is less than NPRO (i.e. not overspeeding). When NPSA is more than NPRO, DXSRD is scheduled to less than maximum decrease-pitch rate limit. The control gain in GGNP units of DXSRD per RPM of NPSA. The minimum value of decrease-pitch rate limit parameter DXSRD is (−DXSRMN).

Figure 1:
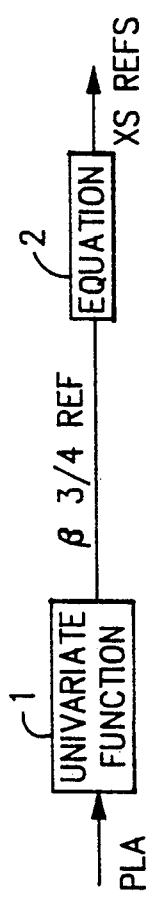
FIG. 1 shows the prior art ground mode operation schedule for a pitch actuator reference signal (XSREFS) as a function of PLA (power lever angle).

Shown at block 17 and block 18 is the logic for generating the term XSREFS which is the pitch actuator scheduled position reference signal. The generation of this signal is well known in the prior art and is also illustrated in FIG. 1.

The previously described signals DXSRI, DXSRD and XSREFS are inputs to block 16. Other inputs to block 16 are power lever angle (PLA) and pitch actuator sensed position (XSSEN). A detailed description of the logic contained in FIG. 3, block 16, is presented in FIG. 4. Referring now to FIG. 4, block 20 shows that power lever angle (PLA) is compared to a constant, PLAX. A PLA less than PLAX implies that reverse thrust is requested, whereas a PLA more than PLAX implies reverse thrust is not requested. XSFWDR as computed in blocks 21 and 22 is the pitch actuator position at which the actuator rate limit logic is deleted. Block 21 sets XSFWDR=XSRATO for conditions when the PLA requests reverse thrust. Block 22 sets XSFWDR=XSNRM for conditions when the PLA does not request reverse thrust. Block 23 compares the pitch actuator sensed position XSSEN to the pitch actuator position at which rate-limit logic is deleted XSFWDR.

FIGS. 3 and 4 show a method for computing pitch control for speed governing. FIG. 3 shows a method for computing an increasing pitch rate limit signal (DXSRI) and a decreasing pitch rate limiting signal (DXSRD).

Figure 5:
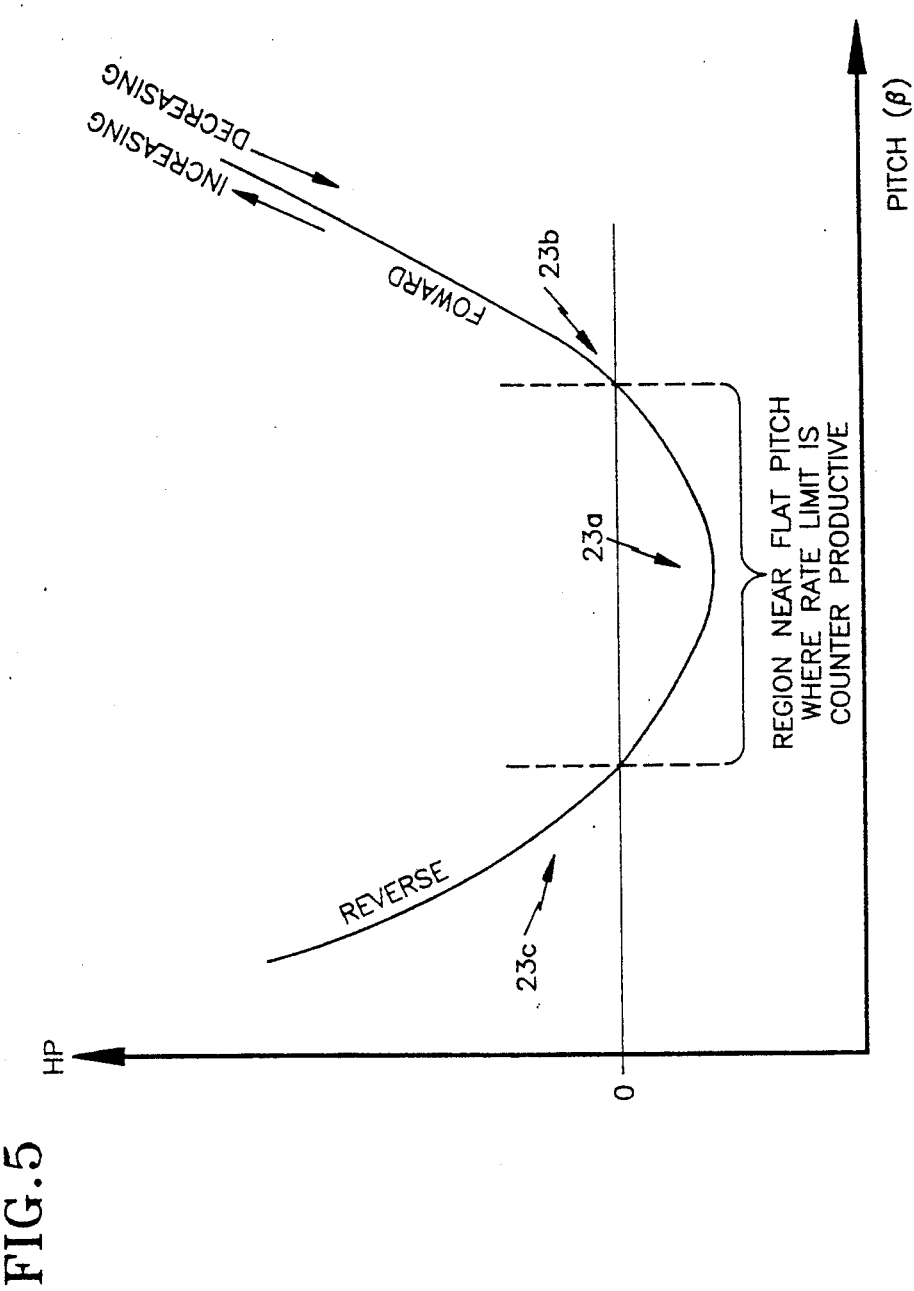
FIG. 5 shows the relationship between power (HP) and propeller pitch.

FIG. 5 shows a flat pitch region 23a between a forward thrust region 23b on the right and reverse thrust region 23c. Near flat pitch, it is counterproductive to slow down the rate of pitch change because the propeller is absorbing energy from the airstream which causes increasing propeller speed. In this region, a slow rate of pitch change will result in higher propeller overspeed. Therefore, in the region 23a near flat pitch, the pitch rate control is deleted.

Referring to FIG. 4, block 23, the rate limit logic is deleted whenever XSSEN is less than XSFWDR. The rate limit logic is effectively deleted in block 24 by setting XSREF2 to be equal to the PLA scheduled actuator reference position XSREFS. Block 23 invokes the rate limit logic whenever XSSEN is greater than or equal to XSFWDR. Block 25 compares the pitch actuator sensed position XSSEN to a scheduled actuator position XSREFS. When XSREFS is less than XSSEN (block 25) indicate the pitch is decreasing, and the actuator reference position for decrease-pitch rate limit is computed in block 26. Block 26 and block 29 use the method of rate limiting described previously using FIG. 2 and equations 1 through 5.

Block 27 compares the actuator reference position when at the rate limit XSREF2 to the scheduled actuator reference position. Conditions when XSREFS is greater than XSREF2 indicate that XSREFS requests less than maximum decrease-pitch rate. Then the actuator reference position XSREF2 is set equal to XSREFS as shown in block 28. Referring back to block 25, conditions when XSREFS is more than XSSEN indicate the pitch is increasing and the increase-pitch rate limit is computed in block 29. Block 30 compares the rate limited actuator reference position XSREF2 to the scheduled actuator reference position XSREFS. Conditions when XSREFS is less than XSREF2 indicate that XSREFS requests less than maximum increase-pitch rate. Then the actuator reference position XSREF2 is set equal to XSREFS as shown in block 31. The ground mode pitch position schedule logic yields an output signal XSREF2 (32) as shown in both FIGS. 3 and 4, where XSREF2 includes any applicable forward thrust increase-pitch and decrease-pitch rate limits. Now referring back to FIG. 3, the higher value of the actuator reference position XSREF2 (32) and the maximum permissible reverse pitch reference signal XSREF1 (33) is selected in block 34 to yield the pitch actuator reference signal XSREF (35). The description provided herein shows that XSREF (35) is the scheduled pitch actuator reference position XSREFS modified to include any applicable increase-pitch rate limits, decrease-pitch rate limits and reverse pitch position limit.

Although the invention has been shown and described with respect to a best mode embodiment thereof, it should be understood by those skilled in the art that the foregoing and various other changes, omissions and deletions in the form and detail thereof may be made therein without departing from the spirit and scope of this invention.

We claim:

1. Apparatus for correcting a propeller speed error by controlling the propeller blade pitch during ground operations of an aircraft, comprising:

propeller speed means, for providing a propeller speed signal indicative of propeller speed;

reverse thrust means, for detecting a power level angle to determine a reverse thrust condition;

reverse underspeed means, for comparing said propeller speed signal to a predetermined reverse underspeed reference signal to determine a reverse underspeed condition in response to said reverse thrust condition;

reverse pitch means, for providing a reverse pitch signal responsive to a scheduled reverse thrust pitch rate as a function of said reverse underspeed condition;

speed error means, for comparing said propeller speed signal to a predetermined reference speed signal to determine a speed error condition;

pitch means, for providing a pitch signal responsive to a scheduled pitch rate as a function of said speed error condition; and pitch command means, responsive to both said reverse pitch signal and said pitch signal, for providing a pitch command signal indicative of the greater of said reverse pitch signal or said pitch signal.

2. Apparatus according to claim 1, wherein said scheduled reverse thrust pitch rate comprises a first rate limit for a first propeller speed and a second rate limit for a second propeller speed, said second propeller speed being greater than said first propeller speed, a predetermined reverse pitch control rate being between said first propeller speed and said second propeller speed.

3. Apparatus according to claim 1, wherein said scheduled pitch rate comprises a first rate limit for a first propeller speed and a second rate limit for a second propeller speed, said second propeller speed being greater than said first propeller speed, a predetermined control rate being between said first propeller speed and said second propeller speed.

4. Apparatus according to claim 1, wherein said speed error means comprises:

underspeed means, for comparing said propeller speed signal to a predetermined underspeed reference signal to determine an underspeed condition; and overspeed means, for comparing said propeller speed signal to a predetermined overspeed reference signal to determine an overspeed condition.

5. Apparatus according to claim 1, wherein said pitch signal is an increase pitch signal.

6. Apparatus according to claim 1, wherein said pitch signal is a decrease pitch signal.

7. Apparatus according to claim 1, further comprising: command power means, for providing a command power signal indicative of a power level angle, said command power signal indicative of said pitch command signal in the absence of said speed error condition.

8. A method for closely matching propeller absorbed power to engine delived power during ground operations of an aircraft, which comprises:

detecting a propeller speed error; and scheduling a propeller pitch rate as a function of said propeller speed error, thereby closely matching propeller absorbed power to engine delived power.

9. The method according to claim 8, wherein said propeller speed error is an underspeed error.

10. The method according to claim 8, wherein said propeller speed error is an overspeed error.

* * * * *

UNITED STATES PATENT AND TRADEMARK OFFICE
CERTIFICATE OF CORRECTION

PATENT NO. : 5,029,091

DATED : July 2, 1991

INVENTOR(S) : Roy W. Schneider et al

It is certified that error appears in the above-identified patent and that said Letters Patent is hereby corrected as shown below:

Claim 7, Column 8, Line 27 "level" should read --lever--

Signed and Sealed this

Sixth Day of April, 1993

Attest:

STEPHEN G. KUNIN

Attesting Officer

Acting Commissioner of Patents and Trademarks